United States Patent [19]

Airhart

[11] Patent Number: 5,010,976

[45] Date of Patent: Apr. 30, 1991

[54] CHARACTERIZATION OF THE FULL ELASTIC EFFECT OF THE NEAR SURFACE ON SEISMIC WAVES

[75] Inventor: Tom P. Airhart, Plano, Tex.

[73] Assignee: Atlantic Richfield Company, Los Angeles, Calif.

[21] Appl. No.: 417,792

[22] Filed: Oct. 4, 1989

[51] Int. Cl.5 ............................................. G01V 1/00
[52] U.S. Cl. ................................... 181/108; 181/111; 181/112; 367/54; 367/38; 367/46
[58] Field of Search ..................... 367/54, 38, 50, 58, 367/46; 181/108, 111, 112

[56] References Cited

U.S. PATENT DOCUMENTS

| | | | |
|---|---|---|---|
| 2,229,191 | 1/1941 | Schaeffer et al. | 367/54 |
| 2,276,335 | 3/1942 | Peterson | 367/36 |
| 3,371,310 | 2/1968 | Silverman | 367/57 |
| 3,378,096 | 4/1988 | Cherry, Jr. | 367/75 |
| 3,866,161 | 2/1975 | Barr, Jr. et al. | 367/15 |
| 3,886,493 | 5/1975 | Farr | 367/49 |
| 4,069,471 | 1/1978 | Silverman | 367/54 |
| 4,498,157 | 2/1985 | Martin et al. | 367/50 |
| 4,519,053 | 5/1985 | Bedenbender et al. | 367/190 |
| 4,636,956 | 1/1987 | Vannier et al. | 367/59 |
| 4,646,274 | 2/1987 | Martinez | 367/41 |
| 4,706,225 | 11/1987 | Raoult | 367/57 |
| 4,707,812 | 11/1987 | Martinez | 367/46 |
| 4,750,157 | 6/1988 | Shei | 367/45 |
| 4,803,666 | 2/1989 | Alford | 367/36 |
| 4,803,669 | 2/1989 | Airhart | 367/72 |
| 4,893,290 | 1/1990 | McNeel et al. | 367/178 |
| 4,903,244 | 2/1990 | Alford | 367/36 |

FOREIGN PATENT DOCUMENTS 2501869 9/1982 France .

OTHER PUBLICATIONS

Sheriff, *Encyclopedic Dictionary of Exploration Geophysics*, Society of Exploration Geophysicists, Tulsa, Oklahoma, p. 47.
Waters, *Reflection Seismology*, 1981, pp. 205, 362.
Walton, "Three-Dimensional Seismic Method", *Geophysics*, vol. 37, No. 3, pp. 417-430, Jun. 1972.

Primary Examiner—Deborah L. Kyle
Assistant Examiner—J. Woodrow Eldred
Attorney, Agent, or Firm—Vinson & Elkins

[57] ABSTRACT

A method of seismic exploration uses recordings from both surface receivers and buried sensors to determine the full elastic effect of the near surface layer on an applied seismic wave. The surface receivers are arranged relative to the seismic source location so that rotational effects may be detected. Buried sensors are located so that vertical effects may be detected. This full elastic effect may be used in subsequent seismic data acquisition to reconcile the effect of the near surface so that the response of the underlying rock formations may be known.

44 Claims, 4 Drawing Sheets

CHARACTERIZATION OF THE FULL ELASTIC EFFECT OF THE NEAR SURFACE ON SEISMIC WAVES

TECHNICAL FIELD OF THE INVENTION

This invention relates generally to seismic surveying, and more particularly, to determining the full elastic effect, on seismic waves, of a weathered layer near the surface.

BACKGROUND OF THE INVENTION

Seismic surveying uses an artificially induced seismic wave to infer underground geological formations. A seismic wave source approximates a delta function by striking the surface or setting off an explosion. Receivers detect the local pattern of ground motion over a short interval of time following the triggering of the seismic source. An amplified output of each receiver is recorded as a seismic trace, which represents the combined response of the layered subsurface and the recording system to the seismic source.

The response of solid rock formations in the earth to various types of applied seismic body waves is well known. A recent development in seismic surveying has been the use of three-component geophones to collect information from each type of body wave. These three-component geophones obtain data that permits particle motion to be represented as a three-component vector, with the motion being in response to compressional waves, vertical shear waves, and horizontal shear waves.

Regardless of the type of waves being detected, as in any transmission system, the signals generated by the seismic source undergo filtering by the earth during transmission to the receiver. The effect of such filtering is considered to be "noise", adverse to the desired seismic data. Thus, interpretation of seismic traces requires that filtering effects be reconciled.

One significant filtering effect that greatly affects the integrity of seismic recordings is the effect of the near surface layer. This near surface layer has properties that are very different from those of the consolidated rocks farther below. For example, the soil and the near surface rocks are affected by the elements, i.e., rain, frost, ice, temperature, and wind, which have long term as well as short term effects. Because of these different properties, the effect of the near surface layer on seismic waves is different from that of the underlying rock, and, unlike the response of seismic waves in solid rock, the response in the near surface is not well known.

Another characteristic of the near surface is that its effect is greater on shear waves than on compressional waves. Furthermore, this near surface effect is relatively overwhelming compared to the relatively subtle effects of the rock formations, with the latter being of interest to seismologists. The result is that the increasing use of multicomponent receivers has led to efforts to eliminate or reconcile the effect of the near surface. One method teaches burying the receivers below the near surface layer to avoid the near surface filtering. Another method teaches using both buried sensors and surface receivers. The buried sensor is under the source and measures the near surface effect so that a deconvolution operator is derived, which is then used to eliminate the near surface effect from the signal received at the surface. A problem with both methods, however, is that exploration results have shown that they do not consistently account for the actual behavior of seismic waves in the near surface. Thus, a need exists for an improved means for determining the effect of the near surface layer on seismic waves.

SUMMARY OF THE INVENTION

An underlying principle of the invention is that the near surface layer has an elastic effect on seismic waves that is not completely determined by measuring techniques used for rock formations. For example, the near surface layer may cause the seismic source wave to move azimuthally. Thus, the basic concept of the invention is to determine the full elastic effect of the near surface layer on the seismic source. This permits a complete deconvolution operator to be obtained.

Another aspect of the invention is a method for determining the effect of the near surface layer on an applied seismic wave. The full elastic effect on the applied signal, including the effect of compressional waves, shear waves, and surface waves, is measured. This measurement can be used in during seismic data acquisition to reconcile for the effects of the near surface layer. Surface receivers, as well as buried sensors, are used to detect the seismic waves at selected points along its path down through the near surface, through the underlying rock formation, and back up through the near surface. The surface receivers are placed so that azimuthal deviations of the seismic source wave are detected.

Another aspect of the invention is a method for obtaining a deconvolution operator, which represents the filtering effect of the near surface layer. This deconvolution operator can be used to eliminate the near surface effect on the seismic trace so that underlying rock formations can be more successfully known. The deconvolution operator is derived from measurements of the seismic source using surface receivers and buried sensors that are arranged to detect both rotational and vertical filtering effects.

Another aspect of the invention is a system of signal sources and receivers for detecting the full elastic effect of the near surface on an applied seismic wave. Sources on the surface, buried sensors, and surface receivers are placed in a three dimensional pattern. The surface receivers are placed so that they receive source signals that deviate from a projected direction. The buried sensors are placed so that they receive downgoing source signals after filtering by the near surface and upcoming source signals after the first filtering by the near surface and after passing through the rock formation under the near surface.

A technical advantage of the invention is that tests to determine the effects of the near surface layer are greatly improved. Elastic effects that were previously undetected are now detected, and a complete deconvolution operator is determined.

BRIEF DESCRIPTION OF THE DRAWINGS

The novel features believed characteristic of the invention are set forth in the appended claims. The invention itself, however, as well as modes of use, and further advantages, will best be understood by reference to the following Detailed Description of illustrative embodiments when read in conjunction with the accompanying Drawings.

FIG. 3b illustrates a strain gauge associated with the tube insertion means of FIG. 3a.

DETAILED DESCRIPTION OF THE INVENTION

In general, the invention may be implemented at any time prior to, or simultaneously with, seismic data acquisition for actual exploration. The preferred method, however, is to implement the invention at about the same time as the acquisition of the seismic data because the invention's measurand, i.e., the near surface effect, is a function of present conditions as well as stable properties. Changing conditions such as moisture and temperature cause the near surface effect to change from one time to another.

As discussed below in connection with FIG. 1, seismic surface receivers are arrayed on points corresponding to one-half of the receiver array intervals anticipated for subsequent exploration data acquisition. Connections are identical with later data acquisition. Sources are placed on source locations corresponding to double the receiver intervals and operated at three times the field effort anticipated for exploration. Buried sensors are placed along at least one shot line and along one side of the surface receiver array.

Figure 1:
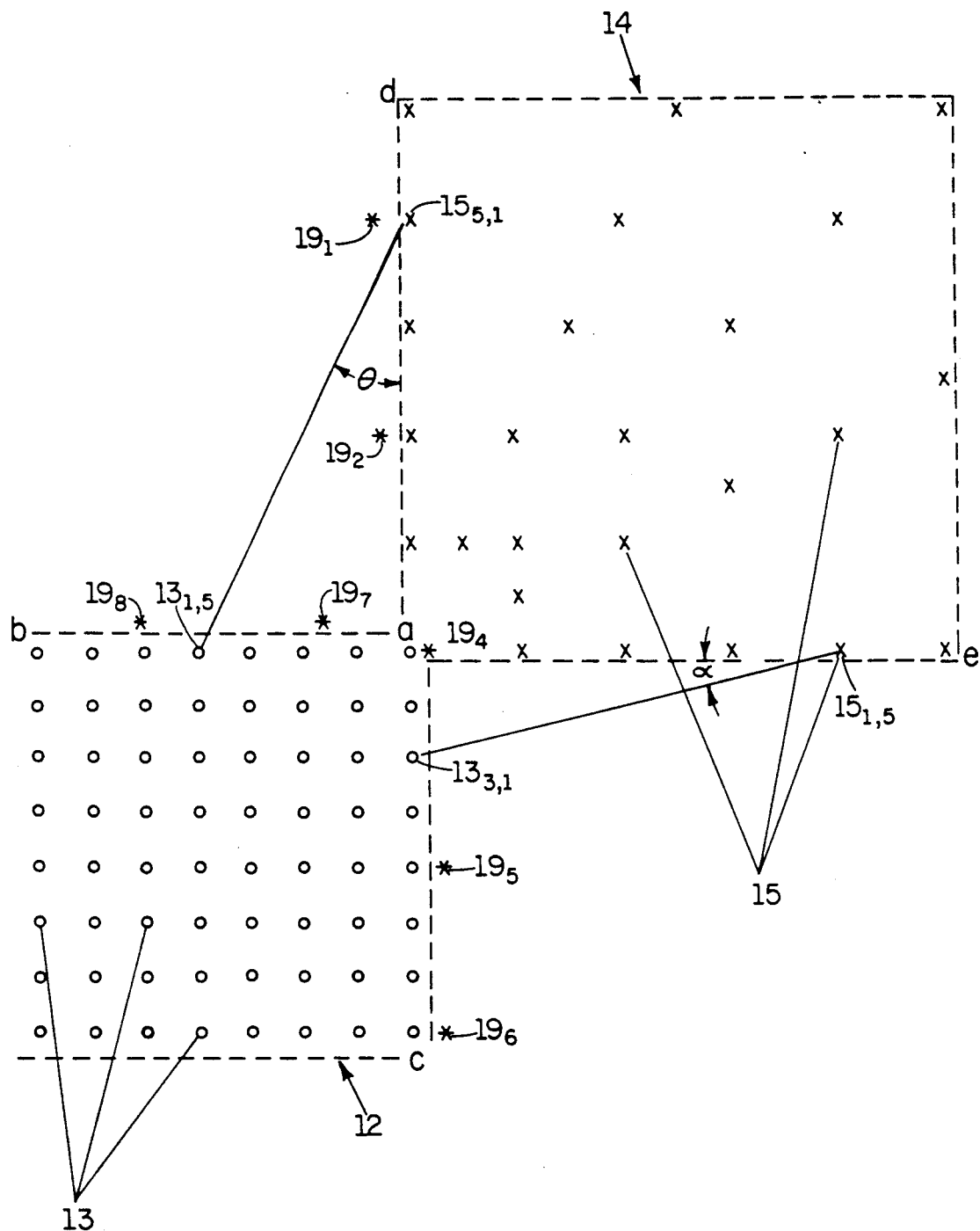
FIG. 1 is a plan view of seismic source locations and receivers arranged in accordance with the present invention.

FIG. 1 is a plan view of a preferred system used in accordance with the present invention on a test field on the earth's surface. There are three basic components of the system: seismic sources on the surface, buried sensors, and surface receivers. The sources, sensors, and receivers comprise a three dimensional spread, with x and y on the surface and z down into the ground. For a complete study of a particular exploration field, it is anticipated that the system of FIG. 1 will be deployed at all extremes of the field and at selected intermediate locations.

In the preferred embodiment, each seismic source is a full waveform source that generates shear and compressional waves. The full waveform source generates a wave that is "directed". If there were no near surface effect, the wave could be expected to follow a projected path along a straight line in a known direction, i.e., the shot line. An example of such a source is the ARIS source developed by ARCO Oil & Gas Company.

In one embodiment of the invention, both the surface receivers and the buried sensors are three-component particle motion receivers, such as are well known in the art of seismology. These receivers detect compressional waves, vertical shear waves, and horizontal shear waves. Assuming that the receivers are three-component receivers, misalignment from the shot line is overcome using the method set out U.S. Pat. No. 4,803,669. In another embodiment of the invention, the buried sensors are strain gauges, as discussed below in connection with FIGS. 3a and 3b.

The locations of the surface seismic receivers form a surface receiver array 12. Typically, the length and width of surface receiver array 12 are in the order of one mile. The primary consideration is that the length of either side of surface receiver array 12 be sufficient to determine azimuthal deviation of seismic waves, as explained below.

Individual surface receivers 13 are located at evenly spaced intervals within surface receiver array 12 to form a matrix. In FIG. 1, the receivers are identified in matrix notation as $13_{i,j}$, where $i=1-8$ and $j=1-8$. In theory, the number of receivers per line is a function of accuracy of the measurements obtained, but at least two must be used per line. In practice, the number of receivers used is also determined by the desired length of either side of surface receiver array 12 and by the size of receiver groups such as are commonly used in the industry. For example, a line of receivers one mile long might use group intervals of 110' to 220', with each group having eight receivers, resulting in 48 to 24 receivers.

The configuration of FIG. 1 of surface receiver array 15 is the preferred embodiment, although a simpler version of surface receiver array 12, such as an L-shaped array along lines a-b and a-c, could accomplish the same result. However, the arrangement of rows and columns of FIG. 1 is preferred in order to obtain increased energy of the signal reflected to the surface. In implementing the invention it is possible to set up the complete surface receiver array 12 at one time, or alternatively, to set up a limited portion appropriate for the particular seismic source. A minimum surface receiver array 12 during use of the invention consists of a line of surface receivers, such as either line a-b or a-c of FIG. 1.

The locations of the seismic sources form a source pattern generally designated as 14. Individual source locations 15 of seismic sources form at least two orthogonal shot lines, a-d and a-e. Source pattern 14 is located off the right angle formed by receiver lines a-b and a-c. One side of the source pattern extends off line a-b and the other side extends off line a-c. In other words, source pattern 14 is in the opposite quadrant from surface receiver array 12. Source locations 15 begin off end of a receiver line in receiver array 12 and are walked up to the beginning of each receiver line. A typical distance of the farthest source location, i.e., the location at d in FIG. 1, is in the order of 2 miles from surface receiver array 12.

An enhancement of the invention includes additional shot lines, lines a-f, a-g, and a-h, along angles between lines a-d and a-e. These additional shot lines permit a more complete indication of the near surface effect. Although seismic injections along shot lines a-d and a-e will detect near surface elastic effects as straight line deviations, the use of the additional shot lines will detect more complicated deviations, such as curves.

The relative locations of surface receiver array 12 and source pattern 14 is consistent with the underlying concept of the invention, that the near surface layer has elastic effects on the source signal that cause the source wave to deviate from its projected path. Surface receiver array 12 permits a seismic source wave to be injected so that at least one surface receiver 13 is in-line with the source wave and at least one surface receiver 13 is off-line. By "in-line" with the source wave is meant that the surface receiver 13 lies along the projected direction of the source wave. All other receivers not on that line or an extension of that line are considered "off-line" with respect to that source wave.

Buried sensors 19 are placed in a line parallel to one of the lines of source pattern 14 and in two lines parallel to the sides of surface receiver array 12. The determination of whether to bury all sensors 19 at once or as needed is a practical consideration. Preferably, for each seismic injection at a source location 15, at least one buried sensor 19 is near the source location 15 and at least one buried sensor 19 is near the line of surface receivers 13 orthogonal to the direction of the seismic injection.

Figure 2:
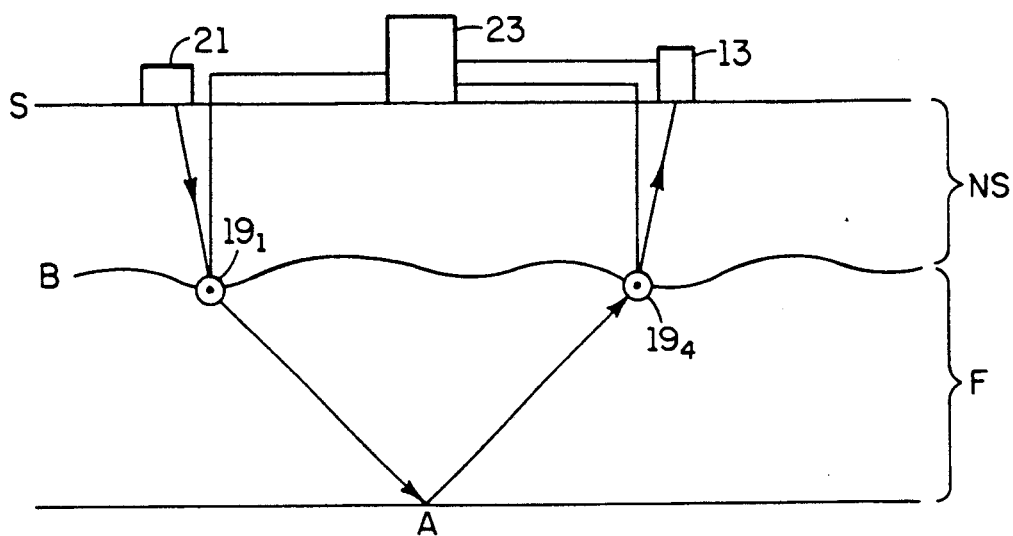
FIG. 2 is a sectional view of a single seismic source and a single surface receiver, with two buried sensors, illustrating the path a seismic wave might follow from the source to the surface receiver.

FIG. 2 is a diagrammatic vertical section through the earth illustrating the invention, but showing only one source location $15_{5,1}$, one surface receiver $13_{1,5}$, and two buried sensors $19_1$ and $19_4$. A seismic source 21 at location 15, the surface receiver $13_{1,5}$, and data recording and processing station 23 are all positioned on an earth surface, S. Appropriate electrical communication is established between these devices, as is well known in the art of seismic surveying.

For purposes of example, in connection with FIG. 2, it is assumed that sensors 19 are three-component seismic receivers, but implementation of the invention using some other type of sensors, such as a strain gauge, is not substantially different. A strain gauge is a type of transducer that relies on an applied strain to change its resistance. A strain gauge operates in accordance with the principle that resistance of a conductor is proportional to its resistivity, cross sectional area, and length. Thus, if one or more of these characteristics change, resistance changes. Strain gauges are available that use metal transduction elements, and the application of strain simply changes their length and their cross sectional area to alter the resistance value. Certain substances, however, exhibit a piezoresistive effect, so that application of strain affects their resistivity. Any of a number of types of strain gauges may be used, with the important characteristics being that the strain gauge be capable of measuring strain in all directions. This permits the complete elastic effect of the near surface to be measured.

One sensor $19_1$ is buried in the earth near source 21 to a depth at which the signature of the source 21 is substantially modified by the filtering effect of the near surface, NS, under surface S. The accuracy of the invention is a function of how well the near surface effects, as opposed to rock formation effects, are measured, thus the buried sensors 19 should be buried at the depth that most closely represents that line of demarcation. The "substantially modified" depth may be satisfied by locating sensor $19_1$ at or below the base, B, of the NS as shown, where B represents the level of bedrock. This depth may also be satisfied with shallower placements. For example, if the depth of the base, B, is undetermined, buried sensors could be placed beneath the several upper most layers of soil. Also, using an uphole survey, the depth where there is the greatest effect of the near surface on wave velocity can be determined, and this depth used to approximate the depth of the near surface layer.

If it is assumed that the near surface NS constitutes approximately the same filter from source 21 to sensor $19_1$ as from sensor $19_4$ to surface receiver $13_{1,5}$, it is possible to practice the invention with a single buried sensor. In this connection, the effects of the near surface are less drastic from sensor $19_4$ because the energy intensity is lower and frequencies are lower. Thus, it may be convenient to use only sensor $19_1$, and assume that the other sensor would have the same response. Nevertheless, the purpose of the invention being the determination of the full elastic effect of the near surface, and the assumption being that these effects are anisotropic, the use of receivers under both the source and the surface receivers is preferred. Thus, a second buried sensor $19_4$ is placed near the surface receivers that will receive whatever seismic wave is being injected.

The buried sensors may be placed beneath or in the near surface, as shown in FIG. 2, by a number of means. One means is the use of drilled boreholes. If a three-component receiver is used, it must be fixed in the borehole so that it will move in response to the surrounding medium, and must be oriented relative to the azimuth with respect to the source. If a strain gauge is used, it must be fixed in the borehole so that it will deform with the medium.

Figure 3A:
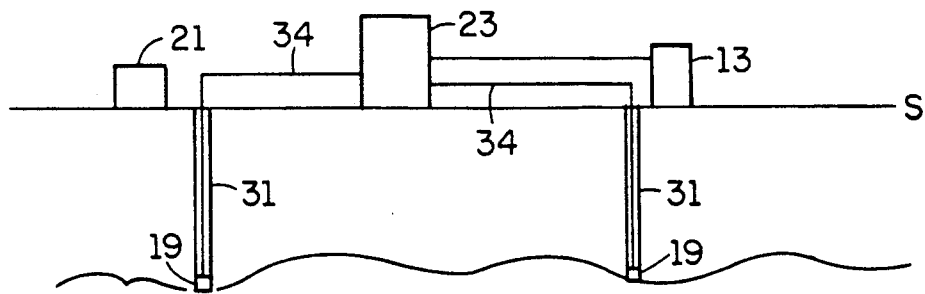
FIG. 3a illustrates a tube insertion means for locating the buried sensors of FIGS. 1 and 2.

FIG. 3a shows another means for placing buried sensors $19_1$ and $19_4$, as well as all other receivers 19, in the ground. As shown in FIG. 3a, each sensor 19 may be inserted into the ground by means of an insertion tube 31. Electrical leads 34 to sensor 19 are brought to the surface through the inside of insertion tube 31 and attached to the seismic recording system. Insertion tube 31 and its associated sensor 19 may also be left in place for use during seismic data acquisition. After preproduction testing and seismic data acquisition have been completed, each insertion tube 31 and sensor 19 may be retrieved for reuse. Specific examples of insertion tubes 31 are threaded jointed tube sections or coiled tubing. An advantage of using insertion tubes 31 is that no prior drilling is required.

Figure 3B:
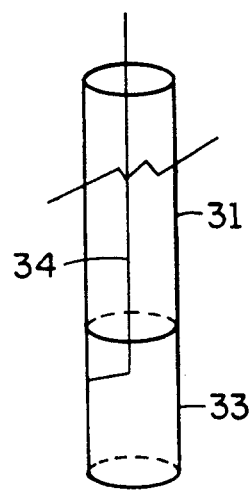

A convenient implementation of a strain gauge used in accordance with the present invention shown in FIG. 3b, which shows a single strain gauge element 33. As is well known in using strain gauges as sensors, various configurations of these elements in different planes may be used. A complete strain gauge is fitted with patterns of strain gauge elements 33 in a configuration designed to measure the complete stress in the surrounding medium. Strain gauge element 33 is used as a sensor 19 and comprises a hollow cylinder at one end of insertion tube 31. Strain gauge element 33 is closed and protected by an attached strain isolated point at its lower end. Strain gauge element 33 is inserted into the ground by means of insertion tube 31 at its upper end, which is strain isolated. The electrical leads 34 for each strain gauge element 33 are brought to the surface through insertion tube 31.

Referring again to FIG. 2, the path of an elastic wave, W, generated by source 21, as received by a surface receiver 13 is illustrated. The wave proceeds downward through the near surface NS to buried sensor $19_1$, then through the rock formation, F, to point A, where it is reflected upward. The wave then proceeds up through formation F and through the near surface NS to the buried sensor $19_4$ to the surface receiver 13. The downgoing and upgoing paths of the wave are refracted at the base B of the near surface NS because of the difference in velocities between the near surface NS and formation F.

For each received signal at receiver 13 that follows a path such as illustrated in FIG. 2, the effects of the near surface NS may be distinguished by using the methods of the invention, described in further detail below.

Figure 4:
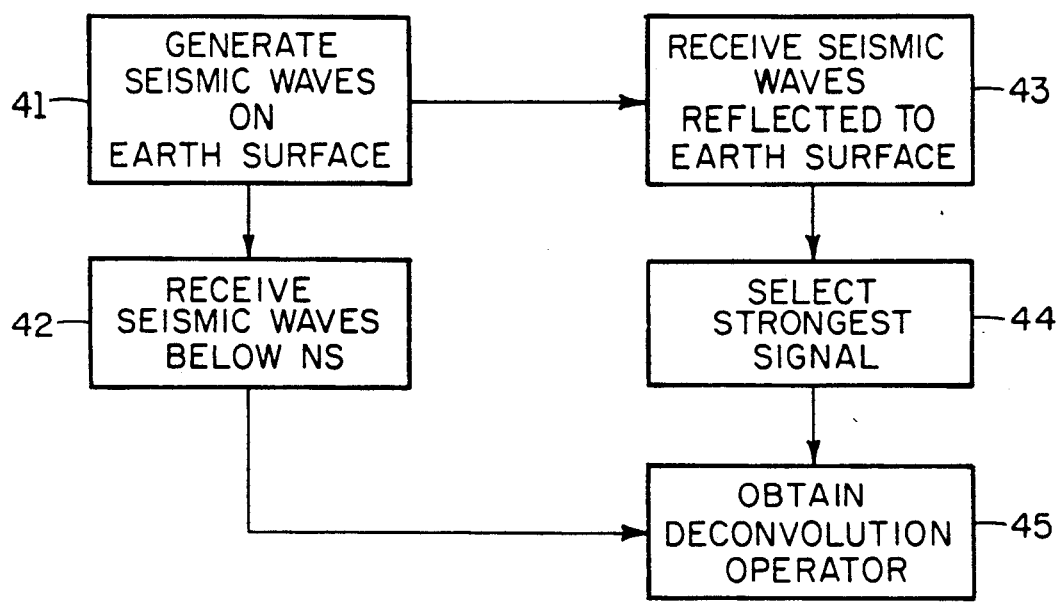
FIG. 4 is a flow diagram of the method of the present invention.

The method of the invention is best understood with reference to both FIGS. 1 and 2, as well as to FIG. 4, which is a block diagram of the steps performed in accordance with one embodiment of the invention. In general, regardless of whether the ultimate goal of the method is deconvolution or some other means for reconciling near surface effects, combined measurements from the surface receivers and the buried sensors in accordance with the invention can be used in a data processing system to determine a number of near surface characteristics. These include reflections of all waveforms, offsets of converted waves along with polarity changes, azimuthal variations in energy level and arrival time of different waveform components, relative energy levels of surface and buried sensors along with rotational effects, indications of near surface waveguide effects due to elevation changes, and variations in elastic properties. These characteristics can be compiled for a comprehensive determination of the full elastic effect of the near surface.

In accordance with this general objective, Step 41 is generating a seismic wave, i.e., a seismic injection, on the earth's surface. The source locations 15 are individually and sequentially excited by source 21 so that only one seismic wave is injected into the earth at any one time. Thus, source 21 can be moved from one position to another for a sequence of seismic recordings.

Generation of the seismic source wave is accomplished with a three-component seismic source, such that the shear waves have a projected direction along a path. It is this projected path that may deviate, and thus indicate rotational effects of the near surface.

Steps 42 and 43 are receiving the seismic wave with surface receivers 13 and buried sensors 19. All three-component receivers are compensated to reconcile for misalignment with respect to the seismic wave direction, using the method of U.S. Pat. No. 4,803,669. Thus, any remaining deviation can be assumed to be due to the effects of the near surface.

For the first seismic injection, surface receivers 13 are set up in accordance with the above described embodiments or an equivalent. Typically, at least one receiver line orthogonal to the direction of the seismic wave is used. A first buried sensor 19 is placed near the source location and a second buried sensor 19 placed near the line of surface receivers 13 that is orthogonal to the source location. For subsequent seismic injections, the buried sensor 19 near the source location may be omitted. The direction of the seismic injection determines which line of surface receivers of array 12 will be used, and also, which buried sensor 19 associated with the surface receivers is used.

When a seismic wave is injected into the ground, any tendency of the near surface NS to cause the wave to deviate from a straight line will be detected by source receiver spread 12. Specifically, for a source at location $15_{5,1}$ if the near surface NS has no rotational effects, the strongest response, i.e., the response having the greatest amplitude, would be at the receiver closest to the source. In FIG. 1, this would be the receiver $13_{1,1}$ at point a. On the other hand, certain elastic effects of the near surface NS may cause the seismic wave to rotate azimuthally with respect to the source. For example, the strongest signal might be at receiver $13_{1,5}$. This indicates a rotational effect of theta degrees from the unrotated shot line.

So far, a clockwise rotational effect of the near surface NS has been assumed. To detect counterclockwise, as well as clockwise rotation, a second seismic wave may be injected at a second location, such as at $15_{1,5}$.

This second location is preferably on a shot line a-e that is orthogonal to the shot line a-d formed by the source at $15_{5,1}$ and surface receiver $13_{1,1}$. The receiver lines to be used are orthogonal to those used to detect the clockwise effects. Thus, for counterclockwise effects, the shot line has been rotated ninety degrees, and the receiver line has been rotated ninety degrees in the opposite direction. A second seismic wave is injected at location $15_{1,5}$. If the strongest response is at receiver $13_{3,1}$, the indication is a rotational effect of angle alpha.

In accordance with the above procedure, surface receiver array 12 may be set up completely as shown in FIG. 1. Alternatively, fewer surface receivers 13 than required for the complete array may be used. As indicated above, for example, receiver array 12 may be comprised of an L-shaped pattern along lines a-b and a-c. If this is the case, it is possible to set up first one line of the L-shape for receiving seismic shots from an orthogonal direction, and then the other line of the L-shape for receiving orthogonal seismic shots. Thus, for example, a line of receivers 13 could be set up along line a-b with seismic source locations 15 along line a-d, then the process repeated with receivers 13 along line a-c with source locations 15 along line a-e.

Regardless of whether clockwise or counterclockwise effects are being sought, responses are obtained from buried sensors 19. For the source signal originating at location $15_{5,1}$ for which the strongest signal is received at surface receiver $13_{1,5}$, signals are also received at buried sensor $19_1$ or at $19_4$, or at both.

Step 44 is interpreting the received signals, which involves selecting the strongest received signal from surface receiver array 12. The location of the receiver 13 associated with this signal is then used to determine the rotational effect of the near surface NS.

Step 45 is obtaining the effect of the near surface NS as a deconvolution operator. In general terms, deconvolution is a method of recovering an input signal from an output signal, using a deconvolution operator for each source wave. Deconvolution may be expressed mathematically in terms of the various signals and filters. Thus, $$R_s = S_s * L_1 * E * L_2,$$

where $R_s$ is the uncompensated seismic record received, as in step 43, at the earth's surface; $S_s$ is the primary source signature on the surface, $L_1$ is the filtering effect of the near surface NS beneath source 21; E is the response of the underlying earth formation F; and $L_2$ is the filtering effect of the near surface NS beneath surface receiver 13.

If $S_w = S_s * L_1$, which is the signature at the buried sensor under the source, the object of deconvolution is to find an inverse filter, i.e., a deconvolution operator, $S'_w$, which is convolved with $R_s$ as follows:

$$R_s * S'_w = E * L_2.$$

A second deconvolution operator, $L'_2$ may be found to represent an inverse filter for $L_2$, and thereby yield only E. It is well known in mathematics that a deconvolution operator convolved with its originating signal results in an impulse function. Thus, if the originating signal is known, the deconvolution operation may be obtained.

Figure 5A:
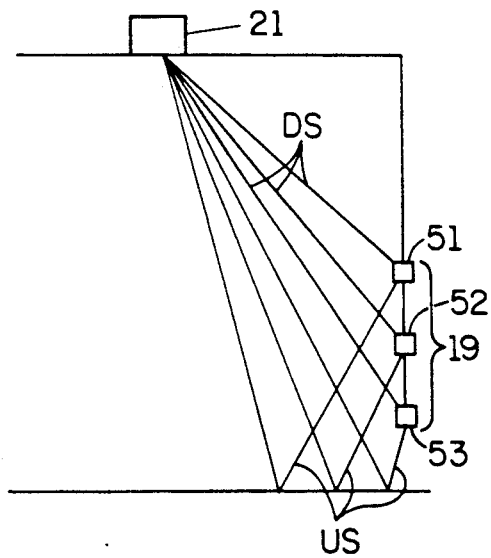
FIGS. 5a and 5b illustrate how a source signature is determined for purposes of obtaining a deconvolution operator in accordance with the present invention.

To obtain $S_w$, an arrangement similar to that shown is FIG. 5a is used. It is well known in the art of seismology, in connection with obtaining a vertical seismic profile, how to discriminate between downgoing seismic energy arriving at a given depth in a borehole from upcoming energy reaching the same depth from nearby reflectors. This same technique is used in the present invention. A vertical line of individual sensors 51, 52, and 53 collectively form sensor 19. Downgoing signals, DS, reach sensors 51, 52, and 53 directly from source 21. Upcoming signals, US, reach sensors 51, 52, and 53 after having been reflected at F.

Figure 5B:
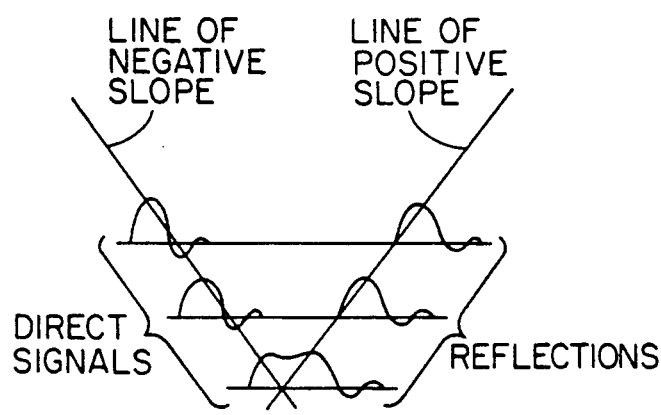

FIG. 5b illustrates a plot of the downgoing and upcoming signals of FIG. 5a. The plot is on a time scale, with a trace for each receiver. Because of moveout, the successive arrival times of the direct signals form a line having a negative slope. The arrival times of the reflected signals form a line of positive slope. The intersection of the two slopes makes it possible to distinguish downgoing from upcoming signals.

Using the receivers of FIG. 5a and the method illustrated in FIG. 5b, a source signature $S_w$ can be identified. Any of buried sensor 19 described above may be comprised of several receivers, as shown in FIG. 5a. In other words, the above references to a buried sensor 19 should be read to include a vertical receiver group, such as receivers 51, 52, and 53.

In one variation of the deconvolution method of the invention, it is assumed that the source signal from source $15_{5,1}$ as detected by receiver $13_{1,5}$ has undergone filtering by the near surface NS. Assuming a generally linear elastic behavior of the formation F, the source signal is relatively unchanged between receiver locations $19_1$ and $19_4$. In other words, the downgoing signals at sensor $19_1$ should closely approximate the upgoing signals at sensor $19_4$. Thus, the deconvolution operator for the upcoming signal $L_2$ is considered to be the same as the deconvolution operator for the downgoing signal $L_1$. This permits the use of only one buried sensor. In the preferred embodiment, however, both buried sensors are used to obtain a more complete indication of the full elastic effect of the near surface.

The deconvolution operator obtained from the buried sensors is used to indicate the near surface effect in the vertical plane. When this deconvolution operator is combined with the effects indicated by the surface receivers 13, the full elastic effect of the near surface is indicated. This elastic effect can then be used in subsequent seismic data acquisition to isolate E, the response due to rock formations.

If a strain gauge is used rather than a three-component receiver, the method of the invention is basically the same. The advantage of using a strain gauge is that a more complete elastic effect is detected, and hence the deconvolution operator more truly represents the near surface effects. Differences in receiver-amplifier characteristics of the equipment can be compensated by using techniques well known in the arts of seismology and electronics.

To measure the elastic effects of a particular field, the steps illustrated in FIG. 1 are used to generate a seismic source wave at different source locations, in accordance with the pattern of FIG. 1 and the variations discussed above. For each source location, the surface receivers and buried sensors used to detect the seismic wave are varied in accordance with the above discussed scheme of detecting azimuthal as well as vertical near surface effects.

Figure 6:
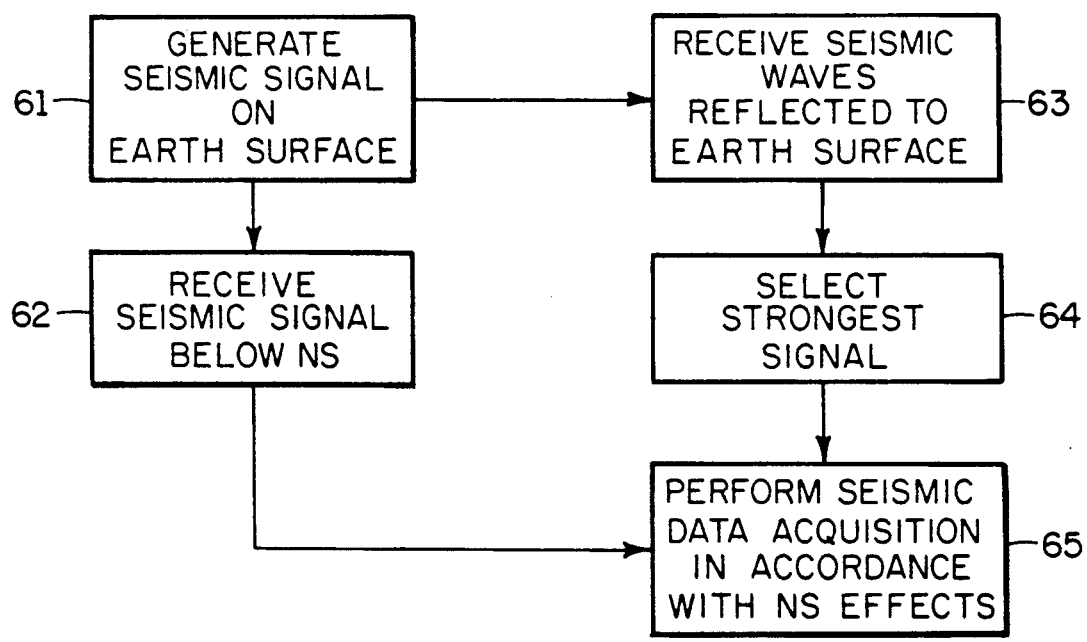
FIG. 6 is a flow diagram of an alternate method of the present invention.

FIG. 6 illustrates an alternative method of the invention. The steps of this method are the same as discussed in connection with FIG. 4, but rather than deconvolving the signals, after a tendency of the near surface to azimuthally deviate seismic waves is determined with the source receiver spread 15, this tendency is used to place the production source and receiver spread. In other words, once the azimuthal direction of the effect of the near surface NS is known, data acquisition tests can be oriented in that direction, causing near surface effects to simply drop out. It is then assumed that distortions are from rock formations and not from the near surface.

Although the invention has been described with reference to specific embodiments, this description is not meant to be construed in a limiting sense. Various modifications of the disclosed embodiment, as well as alternative embodiments, of the invention will become apparent to persons skilled in the art upon reference to the description of the invention. It is, therefore, contemplated that the appended claims will cover such modifications that fall within the true scope of the invention.

What is claimed is:

1. A method for determining the full elastic effect of a near surface layer on a seismic source wave, comprising the steps of:

placing a plurality of surface seismic receivers arranged along a first direction on the surface of the earth;

placing at least one buried sensor beneath the surface of the earth at a depth where the filtering effect of the near surface layer is substantial;

injecting a directed seismic wave into the ground at a first source location remote from said surface receivers, such that at least one surface receiver is in-line and at least one surface receiver is off-line with respect to the projected path of said directed seismic wave;

receiving said seismic wave with said surface receivers and said buried sensor;

generating from said buried sensor and said surface receivers electrical representations of said received seismic waves; and interpreting said electrical representations to determine the effect of the near surface layer on said seismic wave.

2. The method of claim 1, wherein said step of placing surface receivers comprises placing a line of surface receivers, and wherein said step of injecting a seismic wave comprises directing said wave in a direction orthogonal to said line of surface receivers.

3. The method of claim 1, wherein said step of placing surface receivers further comprises placing multiple lines of said surface receivers.

4. The method of claim 1, wherein said step of placing buried sensors comprises placing one receiver beneath said seismic source location and one sensor beneath said surface receivers.

5. The method of claim 1, and further comprising:

placing a plurality of surface seismic receivers arranged along a second direction rotated ninety degrees from said first direction;

injecting a seismic wave into the ground at a second source location such that at least one surface receiver arranged along the second direction is in-line and at least one surface receiver arranged along the second direction is off-line with respect to the shot line of said seismic wave;

wherein the shot line of said seismic wave injected at said second source location is substantially orthogonal to the shot line of said seismic wave injected at said first source location.

6. The method of claim 5, and further comprising:
placing a plurality of surface seismic receivers arranged along a third direction on the surface of the earth;
injecting a seismic wave into the ground at a third source location between said first and second source locations such that the surface seismic receivers arranged along said third direction in a line orthogonal to the direction of the seismic shot line from said third source location.

7. The method of claim 1, and further comprising the step of aligning said surface receivers to compensate for misalignment with respect to said shot line.

8. The method of claim 1, wherein said step of placing a plurality of buried sensors includes using an insertion tube.

9. The method of claim 1, wherein said step of placing at least one buried sensor places a single buried sensor located closer to said first source location than to said surface seismic receivers.

10. The method of claim 1, wherein said interpreting step includes detecting the strongest signal from said surface receivers to determine any rotational effect of the near surface.

11. The method of claim 1, and further comprising the step of obtaining a deconvolution operator in response to said interpreting step.

12. The method of claim 1, and further comprising the step of locating seismic data acquistion equipment in response to said interpreting step.

13. A method for obtaining a deconvolution operator, which represents near surface effects on a seismic source wave, comprising the steps of:
generating a downgoing seismic wave at a source location on the surface of the earth, such that said wave is directed in a projected wave direction;
receiving said wave beneath the surface of the earth at a depth where the wave is substantially modified by the near surface effects, using a buried sensor;
receiving said wave at the surface of the earth at a plurality of locations, using surface receivers, wherein at least one of said receivers is in-line with said projected wave direction and at least one of said receivers is off-line with respect to said projected wave direction; and
isolating the near surface effects using the signals received from said buried sensor and said surface receivers to obtain said deconvolution operator.

14. The method of claim 13, wherein said step of receiving said wave beneath the surface of the earth comprises using a vertical line of receivers for discriminating between downgoing seismic waves and upcoming reflections.

15. The method of claim 13, wherein said step of receiving said wave beneath the surface of the earth comprises using a buried sensor located closer to said source location than to said surface receivers.

16. The method of claim 13, wherein said step of receiving said wave beneath the surface of the earth comprises using a buried sensor located closer to said surface receivers than to said source location.

17. The method of claim 13, wherein said step of receiving said wave beneath the surface of the earth comprises using a first buried sensor located closer to said source location than to said surface receivers and a second buried sensor located closer to said surface receivers than to said source location.

18. The method of claim 17, wherein said step of isolating the near surface effects comprises isolating the near surface effects on downgoing waves from the source and the effect of upcoming waves from a reflector beneath the layer causing the near surface effects.

19. The method of claim 13, and further comprising the step of repeating said wave generating step and said receiving step for various source locations, surface receiver locations, and buried receiver locations until a desired accuracy of the near surface effects can be expected.

20. The method of claim 13, and further comprising the step of changing said location of said source to a new source location and of using surface receivers orthogonal to the projected wave direction from said new source location.

21. The method of claim 13, and further comprising the step of inserting said buried sensors using an insertion tube.

22. The method of claim 21, wherein said a portion of said insertion tube is used as a strain gauge.

23. A seismic wave generating and detecting system for use in determining the elastic influence of a portion of the earth near its surface on seismic waves, comprising:
a plurality of surface seismic receivers, said surface receivers forming at least one line of receivers;
a seismic wave generator for generating a directed seismic wave, said seismic wave generator being placed in a location remote from said surface seismic receivers in such a manner that a first of said surface receivers is in-line and a second of said surface receivers is off-line with respect to the projected path of the directed seismic wave;
a data processing station for receiving and interpreting said received seismic waves from said surface receivers; and
communication lines for transmitting said signals between said surface receivers and said data processing station;
wherein said data processing system is programmed to determine the relative amplitudes of the seismic waves received by said plurality of surface receivers.

24. The system of claim 23, wherein said surface receivers form a two dimensional pattern.

25. The system of claim 24, wherein said surface receivers form an L-shaped pattern.

26. The system of claim 24, wherein said surface receivers form a two dimensional array having a number of columns and rows.

27. The system of claim 23, further comprising:
at least one buried three-component seismic receiver, buried at a depth where the effects of the portion of the earth near its surface are substantial.

28. The system of claim 23, further comprising:
at least one buried strain gauge, buried at a depth where the effects of the portion of the earth near its surface are substantial.

29. The system of claim 23, further comprising:
at least one buried sensor, said buried sensor being buried at a depth where the effects of the portion of the earth near its surface are substantial; and
an insertion tube for inserting said sensor.

30. The system of claim 29, wherein a part of said insertion tube is used as a strain gauge.

31. The system of claim 24, further comprising:
at least one buried sensor, said buried sensor being buried at a depth where the effects of the portion of the earth near its surface are substantial and buried closer to said surface seismic receivers than to said seismic wave generator.

32. The system of claim 24, further comprising:
a first buried sensor, said buried sensor being buried at a depth where the effects of the portion of the earth near its surface are substantial and buried closer to said seismic wave generator than to said surface seismic receivers.

33. The system of claim 24, further comprising:
a second buried sensor buried closer to said surface seismic receivers than to said seismic wave generator.

34. A method for characterizing the effect of the near surface layer on a seismic source wave, comprising the steps of:
generating a seismic wave at a source location on the surface of the earth, said seismic wave directed in a projected wave direction;
sensing said wave at the surface of the earth at a plurality of locations remote from said source location, using a plurality of surface receivers located at a plurality of angles relative to said projected wave direction; and
comparing the relative amplitude of the sensed wave from said plurality of surface receivers in order to characterize the azimuthal deviation of said seismic wave.

35. The method of claim 34, wherein said seismic wave comprises a shear wave.

36. The method of claim 35, wherein said seismic wave comprises a vertical shear wave and a horizontal shear wave.

37. The method of claim 35, wherein said seismic wave further comprises a compressional wave.

38. The method of claim 34, wherein said seismic wave comprises a compressional wave.

39. The method of claim 34, further comprising:
generating a deconvolution operator using the result of said comparing step.

40. The method of claim 39, wherein said generating step generates said deconvolution operator by also using a filter operator corresponding to the filtering effect of the near surface layer.

41. The method of claim 40, further comprising:
sensing said seismic wave at a depth beneath the surface where the seismic wave is significantly modified by the near surface layer; and
generating said filter operator using the result of said step of sensing said seismic wave at a depth beneath the surface.

42. The method of claim 34, further comprising:
generating a second seismic wave at a second source location on the surface of the earth, said seismic wave directed in a second projected wave direction.

43. The method of claim 42, further comprising:
sensing said second seismic wave at surface locations remote from said second source location; and
performing seismic analysis based on said step of sensing said second seismic wave.

44. The method of claim 43, wherein said second projected wave direction is selected, using the result of said comparing step, in such a manner that the azimuthal deviation of said near surface layer does not affect said performing step.

* * * * *